United States Patent [19]

Cornaby

[11] Patent Number: 5,355,486
[45] Date of Patent: Oct. 11, 1994

[54] SYSTEM FOR ALLOCATING TASKS BETWEEN TWO ACTUATORS SERVICING THE SAME MAGNETIC DISK MEDIA IN A SINGLE DISK DRIVE

[75] Inventor: Stephen R. Cornaby, Niwot, Colo.

[73] Assignee: Conner Peripherals, Inc., San Jose, Calif.

[21] Appl. No.: 6,457

[22] Filed: Jan. 21, 1993

[51] Int. Cl.$^5$ .......................... G11B 5/54; G11B 5/596
[52] U.S. Cl. ................................. 395/650; 360/77.08;
360/106; 364/DIG. 1; 364/236.2; 364/230.3;
364/230; 364/248.1; 364/239.51; 364/281.3
[58] Field of Search ...................... 395/650, 425, 275;
360/106, 77.08, 72.01, 78.01, 78.04, 78.12

[56] References Cited

U.S. PATENT DOCUMENTS

| | | | |
|---|---|---|---|
| 4,318,145 | 3/1982 | Frandsen | 360/106 |
| 4,423,448 | 12/1983 | Frandsen | 360/106 |
| 5,124,987 | 6/1992 | Milligan et al. | 371/10.1 |

Primary Examiner—Kevin A. Kriess
Attorney, Agent, or Firm—Fliesler, Dubb, Meyer & Lovejoy

[57] ABSTRACT

A task assigning system within a dual actuator disk drive system wherein each task has a cylinder address comprising a plurality of registers, each register having a unique address and a plurality of fields for storing a task including the cylinder address associated with the tasks, a queue comprising a header register, the header register having a plurality of fields, an insertion means for inserting and ordering the registers into the queue when a task is first stored into the register, a first means for assigning tasks stored in the queue to a first actuator of the dual actuators in the sequence of increasing value of the cylinder addresses of tasks stored in the registers in the queue and a second means for assigning tasks stored in the queue to a second actuator of the dual actuators in the sequence of decreasing values of the cylinder addresses of the tasks stored in the registers in the queue.

24 Claims, 6 Drawing Sheets

| REG ADD | PREV REG ADD | NEXT REG ADD | TAKEN | CYL ADD | |
|---|---|---|---|---|---|
| 101 | 102 | 103 | 104 | 105 | 100 |

| h | h | h | |
|---|---|---|---|
| 1 | 0 | 0 | 0 | 000 |
| 2 | 0 | 0 | 0 | 000 |
| 3 | 0 | 0 | 0 | 000 |
| 4 | 0 | 0 | 0 | 000 |
| 5 | 0 | 0 | 0 | 000 |
| 6 | 0 | 0 | 0 | 000 |
| 7 | 0 | 0 | 0 | 000 |

FIG 3B

| h | 1 | 1 | |
|---|---|---|---|
| 1 | h | h | 1 | 056 |
| 2 | 0 | 0 | 0 | 000 |
| 3 | 0 | 0 | 0 | 000 |
| 4 | 0 | 0 | 0 | 000 |
| 5 | 0 | 0 | 0 | 000 |
| 6 | 0 | 0 | 0 | 000 |
| 7 | 0 | 0 | 0 | 000 |

FIG 3C

| h | 2 | 1 | |
|---|---|---|---|
| 1 | h | 2 | 1 | 056 |
| 2 | 1 | h | 1 | 102 |
| 3 | 0 | 0 | 0 | 000 |
| 4 | 0 | 0 | 0 | 000 |
| 5 | 0 | 0 | 0 | 000 |
| 6 | 0 | 0 | 0 | 000 |
| 7 | 0 | 0 | 0 | 000 |

FIG 3D

| h | 2 | 1 | |
|---|---|---|---|
| 1 | h | 3 | 1 | 056 |
| 2 | 3 | h | 1 | 102 |
| 3 | 1 | 2 | 0 | 076 |
| 4 | 0 | 0 | 0 | 000 |
| 5 | 0 | 0 | 0 | 000 |
| 6 | 0 | 0 | 0 | 000 |
| 7 | 0 | 0 | 0 | 000 |

FIG 3E

| h | 2 | 1 | |
|---|---|---|---|
| 1 | h | 4 | 1 | 056 |
| 2 | 3 | h | 1 | 102 |
| 3 | 4 | 2 | 0 | 076 |
| 4 | 1 | 3 | 0 | 066 |
| 5 | 0 | 0 | 0 | 000 |
| 6 | 0 | 0 | 0 | 000 |
| 7 | 0 | 0 | 0 | 000 |

FIG 3F

| h | 5 | 1 | |
|---|---|---|---|
| 1 | h | 4 | 1 | 056 |
| 2 | 3 | 5 | 1 | 102 |
| 3 | 4 | 2 | 0 | 076 |
| 4 | 1 | 3 | 1 | 066 |
| 5 | 2 | h | 0 | 120 |
| 6 | 0 | 0 | 0 | 000 |
| 7 | 0 | 0 | 0 | 000 |

FIG 3G

| h | 5 | 4 | |
|---|---|---|---|
| 1 | h | 4 | 0 | 056 |
| 2 | 3 | 5 | 1 | 102 |
| 3 | 4 | 2 | 0 | 076 |
| 4 | h | 3 | 1 | 066 |
| 5 | 2 | h | 0 | 120 |
| 6 | 0 | 0 | 0 | 000 |
| 7 | 0 | 0 | 0 | 000 |

FIG 3H

| h | 5 | 4 | |
|---|---|---|---|
| 1 | 2 | 5 | 0 | 103 |
| 2 | 3 | 1 | 1 | 102 |
| 3 | 4 | 2 | 1 | 076 |
| 4 | h | 3 | 1 | 066 |
| 5 | 1 | h | 0 | 120 |
| 6 | 0 | 0 | 0 | 000 |
| 7 | 0 | 0 | 0 | 000 |

SYSTEM FOR ALLOCATING TASKS BETWEEN TWO ACTUATORS SERVICING THE SAME MAGNETIC DISK MEDIA IN A SINGLE DISK DRIVE

A portion of the disclosure of this patent document contains material which is subject to copyright protection. The copyright owner has no objection to the facsimile reproduction by any one of the patent documents or the patent disclosure as it appears in the United States Patent & Trademark Office patent file or records, but otherwise reserves all copyright rights whatsoever.

CROSS-REFERENCE TO RELATED APPLICATIONS

DISK DRIVE SYSTEM USING MULTIPLE EMBEDDED QUADRATURE SERVO FIELDS, Ser. No. 08/083,192, filed Jun. 24, 1993, which is a continuation of Ser. No. 07/386,504, filed Jul. 27, 1989, assigned to the assignee of the present application;

SIGNAL PROCESSING SYSTEM INCLUDING ADAPTIVE READ EQUALIZER WITH SHUTOFF MODE FOR DISK DRIVES, Ser. No. 08/201,720, filed Feb. 25, 1994, which is a continuation of Ser. No. 07/559,899, filed Jul. 30, 1990, assigned to the assignee of the present application;

DISK DRIVE SYSTEM EMPLOYING ADAPTIVE READ/WRITE CHANNEL CONTROLS AND METHOD OF USING SAME, Ser. No. 07/784,655, filed Oct. 28, 1991, which is a continuation of Ser. No. 07/420,371, filed Oct. 12, 1989, assigned to the assignee of the present application;

HIGH PERFORMANCE DISK DRIVE ARCHITECTURE, Ser. No. 08/077,708, filed Jun. 15, 1993, which is a continuation of Ser. No. 07/612,427, filed Nov. 9, 1990, assigned to the assignee of the present application;

MULTIPLE ACTUATOR DISK DRIVE, Ser. No. 07/614,853, filed Nov. 9, 1990 now U.S. Pat. No. 5,293,282, assigned to the assignee of the present application; and SYSTEM FOR DYNAMICALLY ALLOCATING MEMORY REGISTERS FOR FORMING PSEUDO QUEUES, Ser. No. 08/007,199, filed Jan. 21, 1993, assigned to the assignee of the present application.

Each of these related applications is hereby incorporated by reference.

BACKGROUND OF THE INVENTION

1. Field of the Invention

The present invention is generally related to hard disk drives and disk drive electronic control systems. In particular, the present invention relates to a system for allocating tasks between two actuators serving the same magnetic media within the disk drive system.

2. Description of the Related Art

All disk drives have the common problem of the delay associated with the mechanical latency incurred while the read/write transducer is moved to the correct track on the surface of the disc. One solution for reducing the mechanical latency is the employment of two or more actuators for placing transducers over desired tracks on the disk surface. Two actuators interacting with the same magnetic media allows two different functions to be performed at the same time on the same magnetic media thereby increasing the efficiency of the system. Data management routines have been used to select which actuator should be assigned a specific task so as to minimize the amount of travel the actuator assigned has to travel to start the next task assigned to that actuator. One such data management method is to provide a task queue in which the tasks are placed in the order in which they are received by the disk drive controller. The tasks are then assigned on a first in first out basis to the first actuator to become available for assignment. Another approach is to assign the task within the queue that would require the least amount of travel of the available actuator thereby minimizing the latency time to place the actuator's transducer over the proper track to perform the designated task. The first method, while insuring the priority of the sequence of tasks assigned to the disk drive, still suffers from latency of large movements of the actuator from task to task. The second process, while minimizing the latency time for placing the actuator for the next task may result in a given task not being serviced for a long period of time. The problem of the mechanical latency of the movement of the actuators to the desired track is interrelated with the system's overall efficiency to provide service to a specific task.

SUMMARY OF THE INVENTION

It is an object of the invention to provide a system which has a low mechanical latency time associated with the positioning of a transducer over a desired track and the ordering of tasks to yield the maximum overall efficiency of the disk drive system.

It is another object of the invention to provide a system that allocates tasks to a first actuator as it moves from the outer diameter to the inner diameter of the usable surface of the disk and task to a second actuator as it moves from the inner diameter to the outer diameter of the usable surface of the disk.

The present invention assigns tasks to CHANNEL A having actuator A or to CHANNEL B having actuator B. CHANNEL A and CHANNEL B are completely independent of each other and have their own read/write circuitry, track following systems, error correction systems, data buffer and sequencer and control microprocessors. A queue is maintained within the memory for the main microprocessor of the disk drive system for storing information as to each task that is received by the disk drive system. Each register within the queue has a field which indicates the cylinder address associated with the task associated with that register, a "next" field which indicates the address of the register within the queue that has the next highest cylinder address for a task within the queue, a "previous" field which indicates the address of the register within the queue that has the next lowest cylinder address for a task within the queue and a "taken" field indicating whether or not the task is presently being processed. When a task is completed, the register associated with the task will indicate the next task to be assigned to the actuator. If the actuator employed was the actuator moving from the outer diameter to the inner diameter of the disk, then the actuator will be directed to the register indicated in the "next" field. Conversely, if the actuator employed was the actuator moving from the inner diameter to the outer diameter, then the actuator will be directed to the register indicated in the "previous" field. When the actuator moving from the outer diameter to the inner diameter has completed the last task that it can process before reaching the inner diameter, the actuator will be directed to the next task to be processed which is closest to the outer diameter. In similar fashion, when the actuator travelling from the inner diameter to the outer diameter has completed the last task capable that it can process before reaching the outer diameter, the actuator will be directed to the next task to be processed which is closest to the inner diameter. In that actuator A will move orderly across the surface of the disk from the outer diameter to the inner diameter while actuator B will orderly move across the disk from the inner diameter to the outer diameter, it can be realized that all tasks, placed within the queue prior to the actuators starting to transversa the disk surface, will have been serviced when both actuator A and actuator B have made one complete pass across the surface of the disk.

BRIEF DESCRIPTION OF THE DRAWINGS

The invention will be described with respect to the particular embodiments thereof and reference will be made to the drawings, in which:

FIG. 2 is a diagram of a queue register illustrating various fields within the queue.

FIGS. 3A through 3H is a series of examples illustrating the system in progress.

DESCRIPTION OF THE PREFERRED EMBODIMENTS

Figure 1:
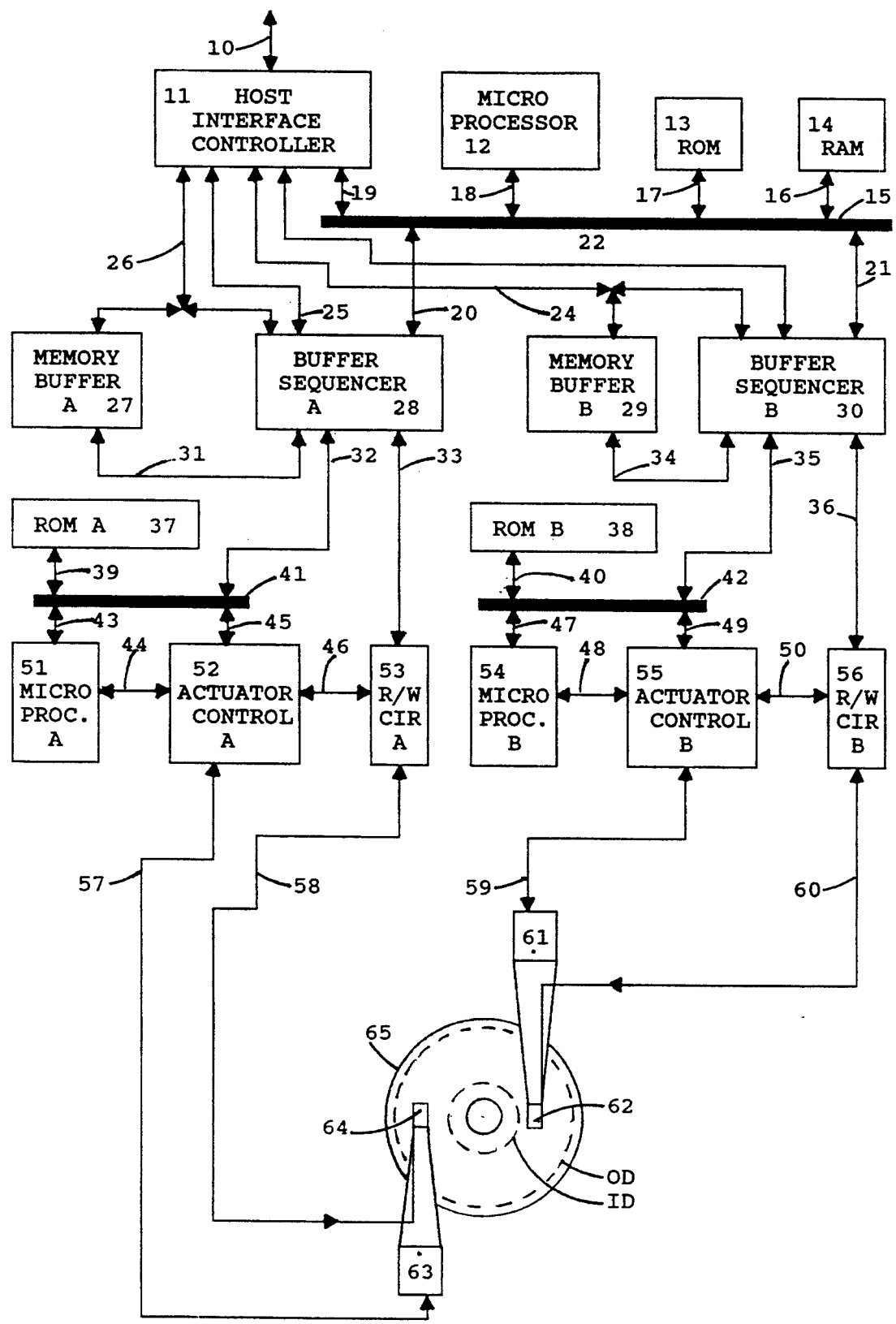
FIG. 1 is a logic diagram of a dual disk drive actuator system embodying the invention.

The dual disk drive actuator system which embodies the invention is show in FIG. 1. The host processor (not shown) is connected via a BUS (not shown) to host interface controller 11 via line 10. Line 10, while shown as a single line, may in fact be comprised of a plurality of lines for communicating with the BUS system as required by the specific BUS system used. Microprocessor 12 controls the operation of the overall system. Microprocessor 12, ROM 13, RAM 14, host interface controller 11, buffer sequencer A 28 and buffer sequencer B 30 are interconnected by BUS 15. Microprocessor 12 controls the high level functions of the disk drive system and the receiving and sending of data and commands through host interface controller 11 to and from the host processor. Microprocessor 12 also assigns tasks and provides commands to two independent channels, CHANNEL A and CHANNEL B. CHANNEL A is comprised of a memory buffer 27 which is controlled by a buffer sequencer 28. Data is transmitted under controller buffer sequencer 28 via line 26 to and from the memory buffer 27 to the host interface controller 11 and to and from disk 65 via read/write circuitry 53. The address for receiving and-/or sending data from buffer memory 27 is provided on line 31 by buffer sequencer 28. Buffer sequencer 28 is connected via lines 20 to BUS 15 to form a communication path between microprocessor 12 and CHANNEL A. The buffer sequencer is further connected via lines 32 to BUS 41 to the microprocessor 43 for controlling the operation of CHANNEL A. Microprocessor 51 is connected via lines 43 to BUS 41 to communicate with its associated ROM 37 via lines 39 and the actuator controller 52 via lines 45. Read/write circuitry 53 records and retrieves data via transducer 64 from disk 65. The data path from the disk is transducer 64 to read/write circuitry 53 to buffer sequencer 28 to memory buffer 27. Actuator controller 52 is connected to read/write circuit 53 for obtaining servo information, sector marks and track information from the data recovered by read/write circuitry 53. Actuator controller 52 controls actuator 63 via control lines 57.

Microprocessor 12 assigns specific tasks to CHANNEL A by sending the task via BUS 15, buffer sequencer 28 to microprocessor 51. Microprocessor 51 will control the performance of the assigned task of retrieving or recording the data stored in memory buffer 27 to or from disk 65. Microprocessor 51 controls the track seek operation, the track following operation and the recording and recovery of data on the magnetic surface of disk 65.

CHANNEL B is identical in structure to CHANNEL A having memory buffer 29, buffer sequencer 30, microprocessor 54 with its associated ROM 38, actuator control 55, read/write circuitry 56, actuator 61 and transducer 62.

As can be seen, both memory buffers 27 and 29 are interconnected to host interface controller 11 as are buffer sequencers 28 and 30. Microprocessor 12 in conjunction with buffer sequencers 28 and 30 controls the transfer of data between memory buffers 27 and 29, host interface 11 and the host processor.

A queue, of a plurality of registers, is physically embodied within RAM 14 . Microprocessor 12 receives tasks from various processors via lines 10 through host interface controller 11. One of the functions of microprocessor 12 is to control the allocations of the tasks between CHANNEL A and CHANNEL B. For each task received by microprocessor 12, a register is assigned within the queue.

FIG. 2 illustrates a register within the queue for controlling the assignment of tasks to CHANNEL A and to CHANNEL B. Referring to FIG. 2, the register 100 has a plurality of fields, four of which are specifically shown and used within the invention. The "previous" field 102 contains the address of the queue register that has the next lowest cylinder address when compared to the register's own cylinder address. The "next" field 103 contains the register address of the queue register that has the next highest cylinder address when compared to the register's own cylinder address. The "taken" field 104 is marked as taken once the task associated with the register has been assigned to a specific channel for processing and is not cleared until the task has been successfully completed. To this end, even though the actual transfer of data to or from disk 65 has been completed to or from the memory buffer of the assigned channel, the "taken" flag will not be removed until the data transfer has been indicated as successful. For example, if CHANNEL A was given a task to recover data from the disk, the task will be completed when the last byte of the requested data is stored in memory buffer 27. CHANNEL A is available to accept a new assignment and move the actuator to the new track location. Microprocessor 12 will then transfer the data from the memory buffer via host interface controller to the requesting host processor. Not until the host processor indicates that it has successfully received the data transmitted from the disk drive system will the "taken" flag be reset freeing the system to mark the register as empty. By this method, the integrity of the data on the disk is maintained until the task requesting the data has been concluded.

The "register address" field 101 is arbitrary and is shown in this embodiment for ease in describing the procedures for allocating tasks to the two channels.

Microprocessor 12 maintains an empty queue to indicate which registers in the queue are empty and thus available for a new assigned task. The empty queue may take on many different forms. It can be a bit map of the registers of the queue where each bit corresponds to a specific register and indicates whether that register is being used within the queue or is empty and available for a new assignment. Another method would be to list the addresses of the registers in the queue and maintain an associated field indicating whether the register for that address is presently being used. A third method would be to keep a sequential list of the addresses of registers that are not in use. A register's address being in the empty queue is, in and of itself, an indication that the register is available for an assignment of a task. The procedure for maintaining such a list of empty registers by any of the foregoing procedures is well within the skill of an ordinary practitioner familiar with writing programs in microcode.

Figure 4:
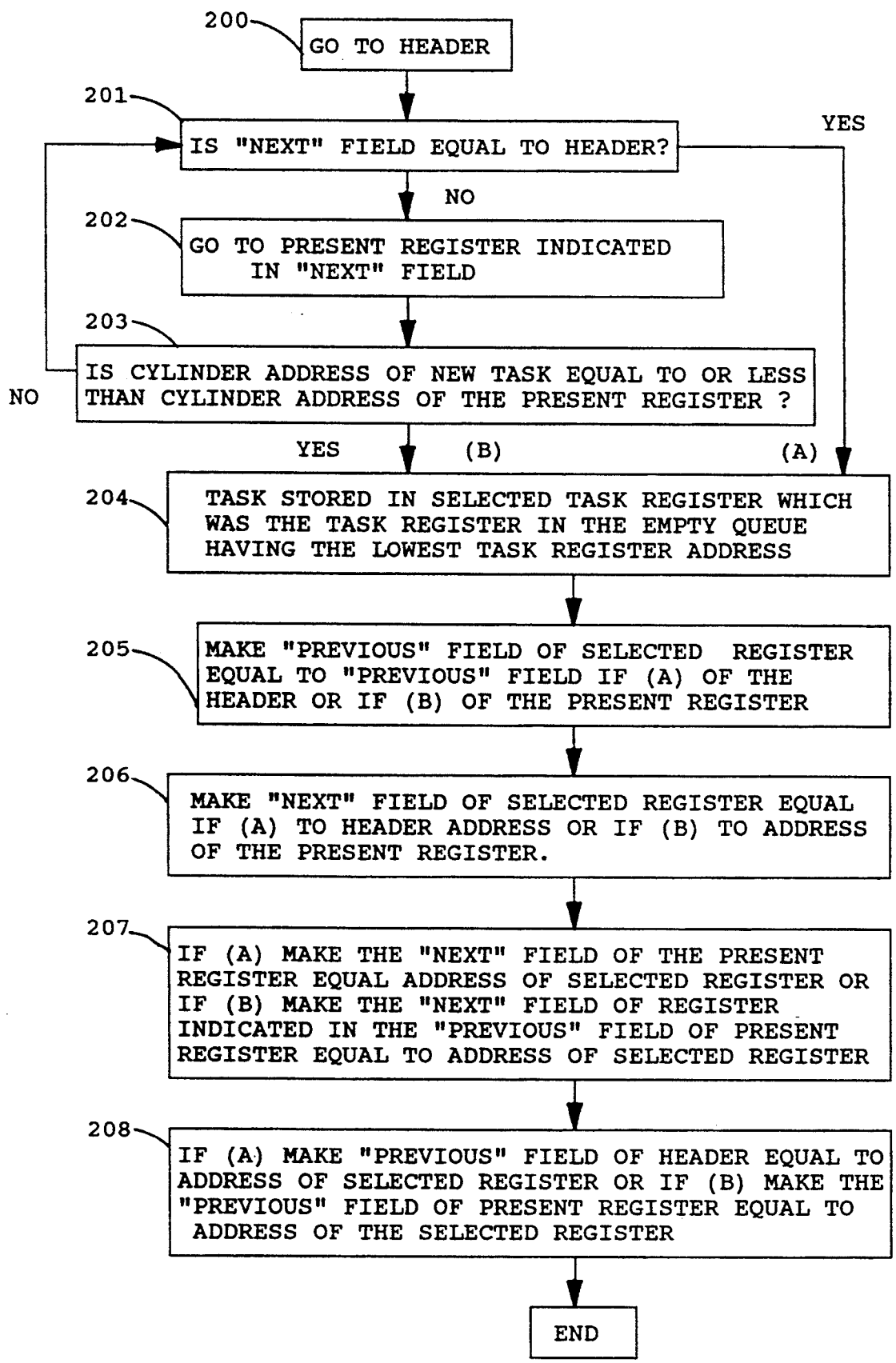
FIG. 4 is a flow chart of the routine for inserting a new task into the queue.

FIG. 4 sets forth the routine for the insertion of a new task into the queue. This occurs when the microprocessor 12 receives a new task to be performed by the system. Microprocessor 12 is capable of storing a plurality of tasks and allocates those tasks to be processed via CHANNEL A or CHANNEL B. When a task is received by microprocessor 12, the task will include the identification of the source of the task, the number of blocks of data to be transferred and an unique identification address of where the data should be written to or read from by the disk drive. The identification address is translated by the disk drive into unique cylinder, head and sector addresses for the new task which are stored in the task register assigned to the new task. The system will assign each new task to the task register in the empty queue which has the lowest task register address.

Although FIG. 1 only shows one disk, it should be understood that there can be a plurality of stacked disks with interleaving actuator arm assemblies with corresponding transducers for communicating with both sides of each disk. Each of the two actuators therefor can be comprised of a plurality of actuator arms where each arm carries a transducer for addressing a specific magnetic surface of one of the disks.

The recording technique used for recording data on the disk is to record the data in consecutive tracks on the disk. This is a departure from the recording scheme from where the data is recorded in cylinders, that is first on track one on side one of disk one, then on track one of side two of disk one, then track one on side one of disk two, and then on track one of side two of disk two, etc, until the data is recorded. Here the data is not recorded through cylinders but rather across the surface of a single magnetic disk. It is possible that a data block may start on the surface of one disk and then overflow to the surface of another disk.

There is a plurality of task registers, each having a distinct address, which are inserted into and removed from a queue. The queue is made up of a header register which defines that structure of the queue and links the task registers inserted into the queue. The header register has a unique address h and contains two fields, a "previous" field containing the address of the task register having the highest address in the queue or the header address h if the queue is empty and a "next" field containing the address of the task register having the lowest address in the queue or the header address h if the queue is empty.

Referring to FIG. 4, the routine is there shown for inserting a new task into the queue. The routine will first go to the header register, step 200, and determine if the address stored in "next" field is the header address, step 201. If it is the header address then the routine will branch and enter step 204 as option (A). If it is not the header address then the routine will go to the register, hereinafter referred to as the present register, whose address is stored in the "next" field of the register being tested, step 202, and perform the test of step 203. This test compares the cylinder address stored in the cylinder address field of the present register with the cylinder address associated with the task to be stored. If the task's cylinder address is equal to or less than the cylinder address stored in the present register, the routine will branch and enter step 204 as option (B). If the task's cylinder address is greater than the cylinder address stored in the present register, the routine will branch back to step 201 and test the "next" field of the present register for the header address. If the "next" field of the present register contain the header address, the routine will branch and enter step 204 as option (A). This condition means that the task has the highest cylinder address of all tasks stored in the queue and will be stored in a task register having the highest address in the queue. If the "next" field of the present register does not have the header address stored therein, the routine will go to the register whose address does appear in the "next" field of the present register, step 203, and that newly addressed register becomes the present register in the routine. The routine loops on steps 203, 201 and 202 until the routine exits the loop from either step 201 as option (A) or step 203 as option (B).

Step 206 will store the new task into the task register, hereinafter referred to as the selected register, in the empty queue that has the lowest task register address.

If step 204 was entered as option (A) then option (A) choices will be followed in step 205, 206, 208 and 209. Step 205 makes the "previous" field of the selected register equal to the "previous" field of the header register. Step 206 makes the "next" field of the selected register equal to the address of the header register. Step 207 will make the "next" field of the present register equal to the address of the selected register. Step 208 will make the "previous" field of the header register equal to the address of the selected register. The selected register's address is then removed from the empty register queue since the selected register has now effectively been reinserted actively into the queue of tasks.

If step 204 was entered as option (B) then option (B) choices will be followed in step 205, 206, 208 and 209. Step 205 makes the "previous" field of the selected register equal to the register address contained in the "previous" field of the present register. Step 206 makes the "next" field of the selected register equal to the address of the present register. Step 207 will make the "next" field of the register indicated in the "previous" field of the present register equal to the address of the selected register. Step 208 will make the "previous" field of the present register equal to the address of the selected register. The selected register's address is then removed from the empty register queue since the selected register has now effectively been reinserted actively into the queue of tasks.

Figure 5:
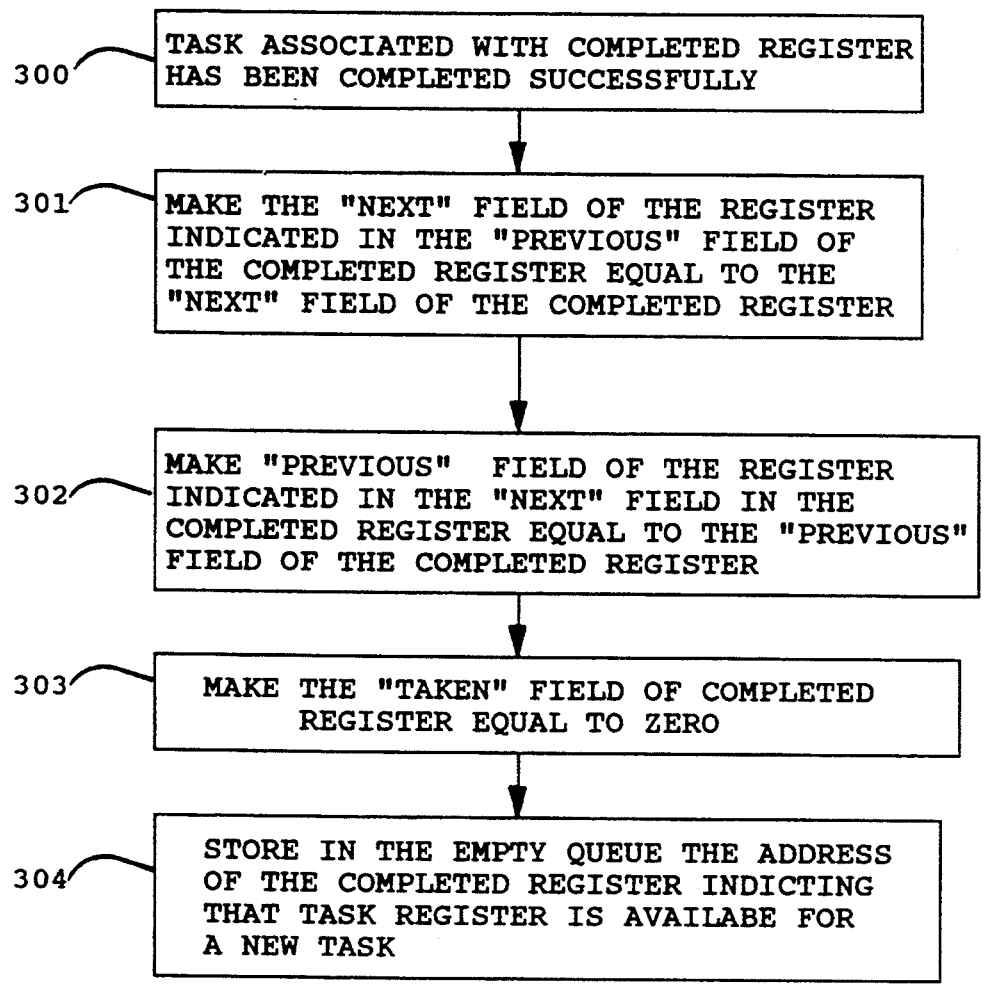
FIG. 5 is a flow chart of the routing for removing a completed task from the queue.

FIG. 5 is the routine for removing a completed task from the queue. This condition will exist when a task has been successfully completed such that the task may be safely removed from the queue. This condition is recognized by the microprocessor 12 in step 300. Step 301 makes the "next" field of the register indicated in the "previous" field of the completed register equal to the "next" field of the completed register. Step 302 makes the "previous" field of the register indicated in the "next" field of the completed register equal to the "previous" field of the completed register. Step 303 sets the "taken" fields of the completed register to zero. Finally, the address of the completed register will be entered in the empty queue as being a task register which can be assigned a new task.

Figure 6:
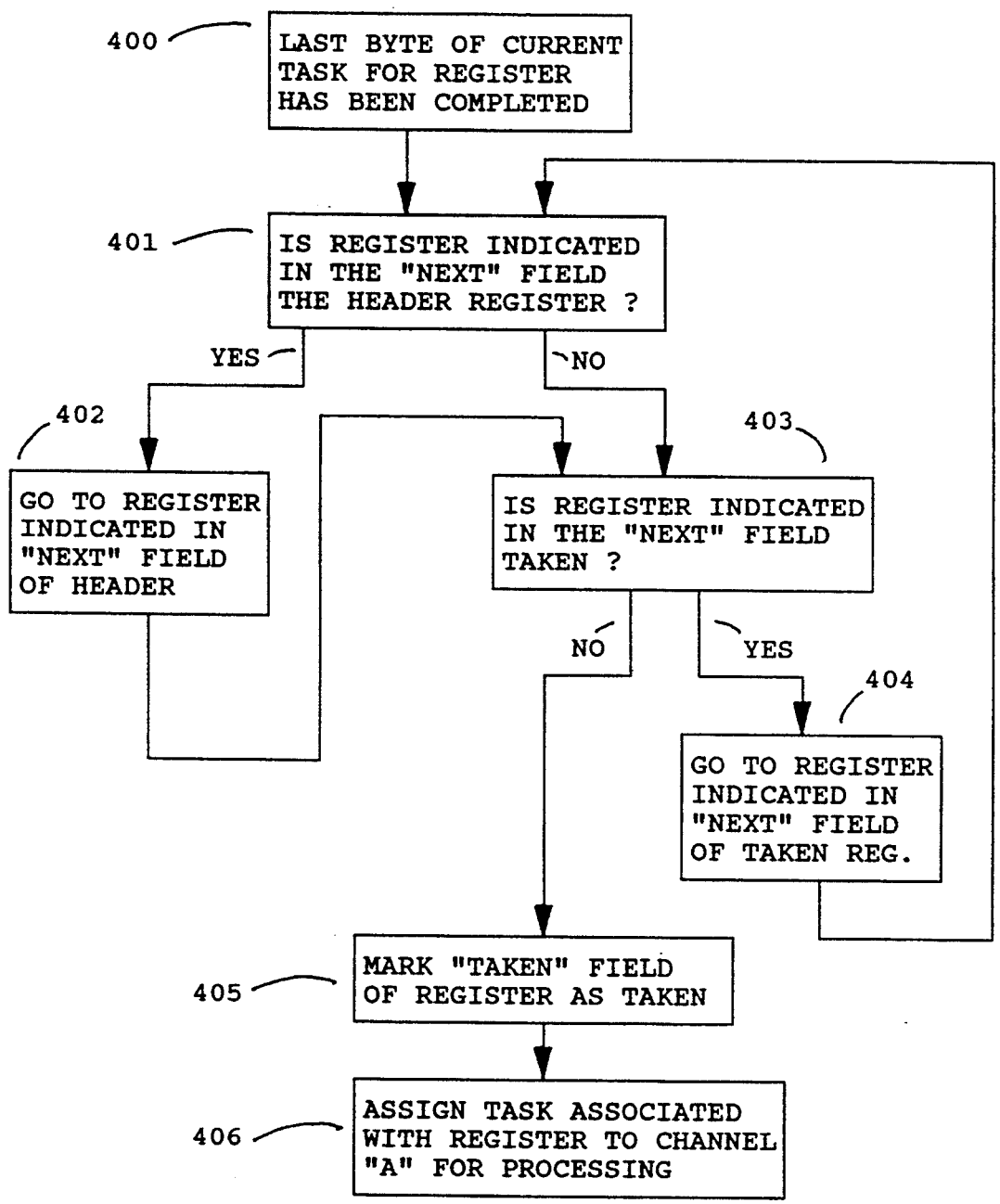
FIG. 6 is a flow chart of the routine for assigning the next task for CHANNEL "A".

FIG. 6 is the routine for assigning the next task for CHANNEL A. As previously described, step 400 will determine if the last byte of the current task for the register being serviced by CHANNEL A has been completed. Since the actuator may now be moved to the location for the next task, microprocessor 12 must determine what the next task for CHANNEL A will be. Step 401 checks the "next" field of the current register to determine if the "next" field is equal to the queue address of the header register and if so step 402 which causes the processor to interrogate the register indicated in the "next" field of the header by step 403. If the "next" field in the current register is not the queue address for the header, then the routine proceeds directly to step 403. Step 403 tests the "taken" field of the register whose address is indicated in the "next" field of the current register. If the "taken" field indicates that the register is taken, step 404 will cause the system to interrogate the register indicated in the "next" field of this taken register by branching to step 401. When the conditions of 401 and 403 are properly met, step 405, the current register, not being the header register or a taken register, will be marked as taken and step 406 will assign the task associated with that register to CHANNEL A for processing. CHANNEL A will therefor begin to move the actuator to the cylinder address of the register marked taken and whose task has been assigned to CHANNEL A.

Figure 7:
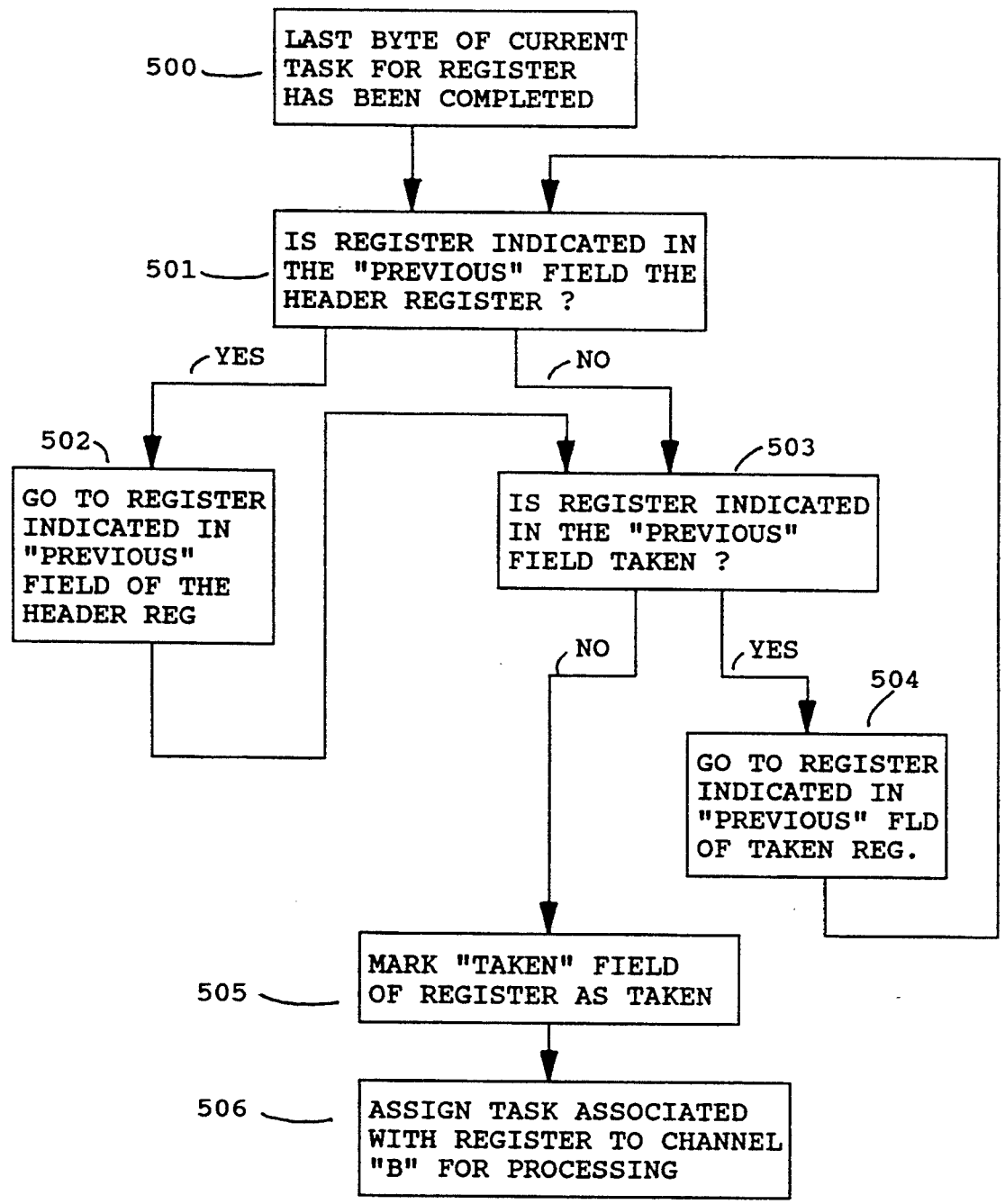
FIG. 7 is a flow chart of the routine for assigning the next task for CHANNEL "B".

FIG. 7 is the routine for assigning the next task for CHANNEL B and comprises steps 500, 501, 502, 503, 504, 505 and 506. The routine for CHANNEL B is exactly the same for the routine for CHANNEL A except that the assigned task of the register that has been marked as taken by step 505 will be assigned to CHANNEL B for processing by step 506.

The invention will be further described by means of the examples shown in FIG. 3A through FIG. 3H. In this example, there are seven task registers having addresses 1 through 7 and a header register having address h. It should be understood that any number of task registers can be used and this will depend on how many tasks the designer of the system wishes microprocessor 12 to store in the queue for processing.

FIG. 3A shows the queue being empty and the header register's "previous" and "next" fields both being equal to the header address h. Task registers 1 through 7 are empty and their addresses are listed in the empty queue as being available for insertion into the queue. The queue at this time is comprised only of the header register.

Assume that task 1 is received by processor 12 and has a cylinder address of 56. The routine of FIG. 4 will perform steps 200,201,204,205A,206A,207A and 208A in that order in order to store task 1 in register 1 and place register 1 in the queue. When the routine is completed the queue will contain the header register and register 1. At step 201 the routine will branch to step 204 as option (A) since the "next" field of the header contained the header address h. Step 204 will have task 1 stored into register 1 since the lowest task register address in the empty queue was the address of register 1. Register 1 is the selected register in the routine for the following steps. Step 205A makes the "previous" field of register 1 equal to the address in the "previous" field of the header which is the header address h. Step 206A makes the "next" field of register 1 equal to the header address h. Step 207A makes the "next" field of the header register equal to 1, the address of register 1. Step 208A makes the "previous" field of the header register equal to 1, the address of register 1. The system will then assign task 1 to CHANNEL A by default and will set a 1 into the "taken" field of register 1. FIG. 3B shows the state of all registers after the routine has been completed.

Next assume that task 2 having cylinder address 102 is received by microprocessor 12. the routine of FIG. 4 will perform steps 200, 201, 202, 203, 201, 204, 205A, 206A, 207A and 208A in that order. The routine will go to register 1 by steps 200, 201 and 202 since the "next" field of the header register contained the address for register 1. Step 203 determines that the cylinder address of task 3 is greater than the cylinder address stored in register 1 and goes to step 201. Step 201 determines that the "next" field of register 1 is equal to the header address and therefor branches to step 204 as option (A). Step 204 will have task 2 stored into register 2 since the lowest address contained in the empty queue is that of register 2. At this time the present register is register 1 and the selected register is register 2. Step 205A makes the "previous" field of register 2 equal to the address in the "previous" field of the header which is 1. Step 206A makes the "next" field of register 2 equal to the header address h. Step 207A makes the "next" field of register 1 equal to 2, the address of register 2. Step 208A makes the "previous" field of the header register equal to 2, the address of register 2. The system will then assign task 2 to CHANNEL B by default and will set a 1 into the "taken" field of register 2. FIG. 3C shows the state of all registers after the routine has been completed. The queue now contains the header register, register 1 and register 2 ordered in that order.

Next assume that task 3 having cylinder address 76 is received by microprocessor 12. The routine of FIG. 4 will perform steps 200, 201, 202, 203, 201, 202, 203, 204, 205B, 206B, 207B and 208B in that order. The routine will go to register 1 since steps 200, 201 and 202 are directed by the address in the "next" field of the header register. The routine will then go to register 2 since its address is stored in the "next" field of register 1 as the result of the test of steps 203 and 201 were both negative. The test of step 203 determines that the cylinder address of task 3 is less than the cylinder address stored in register 2 and branches to step 204 as option (B). Step 204 will have task 3 stored into register 3 since the lowest task register's address stored in the empty queue is that of register 3. At this time the present register is register 2 and the selected register is register 3. Step 205B makes the "previous" field of register 3 equal to the address in the "previous" field of register 2 which is equal to 1. Step 206B makes the "next" field of register 3 equal to the address of register 2. Step 207B makes the "next" field of register 1 equal to 3, the address of register 3. Step 208A makes the "previous" field of the register 2 equal to 3, the address of register 3. The queue now contains the header register, register 1, register 3 and register 2, in that order. Effectively register 3 has been inserted into the queue between register 1 and register 2 and the queue has been ordered in accordance with the cylinder addresses stored within each of the registers in the queue. FIG. 3D show the status of all registers after the routine of FIG. 4 has been completed.

Next assume that task 4 using cylinder 66 is received by microprocessor 12. The routine for FIG. 4 will perform the steps of 200, 201, 202, 203, 201, 202, 202, 204, 205B, 206B, 207B and 208B in that order. The routine will go to register 1 since steps 200, 201 and 202 are directed by the address in the "next" field of the header register. The routine will then go to register 3 since its address is stored in the "next" field of register 1 as the result of the test of steps 203 and 201 were both negative. The test of step 203 determines that the cylinder address of task 4 is less than the cylinder address stored in register 3 and branches to step 204 as option (B). Step 204 will have task 4 stored into register 4 since the lowest task register's address stored in the empty queue is that of register 4. At this time the present register is register 3 and the selected register is register 4. Step 205B makes the "previous" field of register 4 equal to the address in the "previous" field of register 3 which is equal to 1. Step 206B makes the "next" field of register 4 equal to 3, the address of register 3. Step 207B makes the "next" field of register 1 equal to 4, the address of register 3. Step 208A makes the "previous" field of the register 3 equal to 4, the address of register 4. The queue now contains the header register, register 1, register 4, register 3 and register 2 in that order. Effectively, register 4 has been inserted into the queue between register 1 and register 3 and the queue has been ordered in accordance with the cylinder addresses stored within each of the registers in the queue. FIG. 3E show the status of all registers after the routine of FIG. 4 has been completed.

Assume that the task 5 using cylinder 120 is now received by microprocessor 12. Further, the last byte of task 1 associated with register 1 has been sensed. Before an assignment of a task to a channel can be made, all new tasks received by the microprocessor 12 that have not been inserted into the queue must be inserted into the queue. Therefor task 5 dealing with cylinder 120 will first be inserted into the queue before any further action of reassignment of the next task to CHANNEL A will be done. The routine of FIG. 4 performs the steps of 200, 201, 202, 203, 201, 202, 203, 201, 202, 203, 201, 202, 203, 201, 204, 205A, 206A, 207A and 208A in that order. In this process the routine will loop three times before finally exiting the loop at step 201. Step 204 will have task 5 stored into register 5 since that is the lowest register address stored in the empty queue. At this time the present register is register 2 and the selected register is register 5. Step 205A makes the "previous" field of register 5 equal to the address in the "previous" field of the header which is 2. Step 206A makes the "next" field of register 5 equal to the header address h. Step 207A makes the "next" field of register 2 equal to 5, the address of register 5. Step 208A makes the "previous" field of the header register equal to 5, the address of register 5. The queue now contains the header register, register 1, register 4, register 3, register 2 and register 5 in that order. Effectively, register 5 has been inserted into the queue between register 2 and the header register h and the queue has been ordered in accordance with the cylinder addresses stored within each of the registers in the queue. FIG. 3F show the status of all registers after the routine of FIG. 4 has been completed. Now that task 5 has been inserted into the queue, the process can now address the reassignment of CHANNEL A.

Referring to FIG. 6, in step 400 the system will have sensed that the last byte of task 1 assigned to register 1 has been completed. At this time the contents of the registers in the queue are shown in FIG. 3F. The "next" field of register 1 points to register 4 and therefor step 403 is performed. Since register 4's "taken" field, as shown in FIG. 3E, indicates that the task assigned to register 4 is not being processed, task 4 is assigned to CHANNEL A and the "taken" field of register 4 is changed to a 1 to mark register 4 as taken. It should be noted that three registers are indicated as taken within the queue even though only two tasks are actually being serviced by the actuators. This is because register 1's task, although the data transfer requiring the use of the actuator has been completed, the total task has not been completed by the disk drive system. CHANNEL A will now be given the information regarding task 4 such that it can begin moving the actuator to cylinder 66 in contemplation of performing that task.

Assume that task 1 has now been successfully completed such that it may be removed from the queue. The routine set forth in FIG. 5 is therefor implemented. Steps 301 will make the "next" field of the header register equal to 4, the address stored in the "next" field of completed register 1. Step 302 will make the "previous" field of register 4 equal to h, the address stored in the "previous" field of completed register 1. The "taken" field of register 1 is set to 0. The address of register 1 is also listed in the empty queue as being available for a new task. The queue now contains the header register, register 4, register 3, register 2 and register 5 in that order. Effectively, register 1 has been removed from the queue and the registers in the queue are still ordered by the cylinder addresses stored in the queue registers. FIG. 3G shows the status of all registers after the routine of FIG. 5 has been completed.

Assume that task 6 using cylinder 103 is next received by microprocessor 12 and that the last byte associated with task 2 has been sensed. Once again the new task will be inserted into the queue before any reassignment of task can take place. The routine of FIG. 4 will perform the steps of 200, 201, 202, 203, 201, 202, 203, 201, 202, 203, 201, 202, 203, 204, 205B, 206B, 207B and 208B in that order. The routine has looped three times and on the fourth pass exited the loop at step 203 and branched to step 204 as option (B). Step 204 will have task 6 stored in register 1 since the lowest register address in the empty queue is that of register 1. At this time the present register is register 5 and the selected register is register 1. Step 205B makes the "previous" field of register 1 equal to the address in the "previous" field of register 5 which is equal to 2. Step 206B makes the "next" field of register 1 equal to 5, the address of register 5. Step 207B makes the "next" field of register 2 equal to 1, the address of register 1. Step 208A makes the "previous" field of the register 5 equal to 1, the address of register 1. The queue now contains the header register, register 4, register 3, register 2, register 1 and register 5 in that order. Effectively, register 1 has been inserted into the queue between register 2 and register 5 and the queue has been ordered in accordance with the cylinder addresses stored within each of the registers in the queue. FIG. 3H shows the status of all registers after the routine of FIG. 4 has been completed.

Referring to FIG. 7, in step 500 the system will sense that the last byte of task 2, which was assigned to CHANNEL B, has been completed. Assignment of tasks to CHANNEL B is controlled by the "previous" fields of the registers in the queue. The "previous" field of register 2 points to register 3. Since register 3's "taken" field is 0, task 3 will be assigned to CHANNEL B for processing. Register 3's "taken" field will be set to a 1 indicating that the task associated with register 3 is being processed. It should be noted that the next task for CHANNEL B was directed to register 3 with a cylinder address of 76 even though register 1 had a cylinder address of 103 which was only one cylinder away from the cylinder address of 102 for the completed register 2. This is because the system follows an orderly process by which CHANNEL B will always be assigned to the register having the next lowest cylinder address.

The routines set forth in FIGS. 4, 5, 6 and 7 are controlled by microcode stored within RAM 14 and executed by microprocessor 12. The invention as described heretofore uses known digital software implementation and the microprogram was assembled using Motorola 68C11 Assembler, Series 5.0., which is provided in Appendix A. The program of Appendix A carries out the functions of the routines of the flow charts as shown in FIGS. 4, 5, 6 and 7 and performs the steps for allocating the task to CHANNEL A or B in accordance with the rules heretofore set forth. It should be understood that the method can be embodied in other microprograms using other programming languages or can be store in a read-only memory within a computer system. It is also possible for the queue to be a physical queue comprised of separate hardware registers whose contents can be read by microprocessor 12. The function of microprocessor 12 can be designed for implementation by a hardware state machine dedicated to perform the functions necessary to carry out the routines described herein.

While the invention has been particularly shown and described with reference to the preferred embodiment therefor, it will be understood by those skilled in the art that changes in form and detail may be made therein without departing from the spirit and scope of the invention. Given the above disclosure of general concepts and specific embodiments, the scope of the protection sought is defined by the following claims.

APPENDIX A

© Conner Peripherals, Inc. 1992

```
;************************************************************
; NAME: QTOEMPTY
;************************************************************
; PURPOSE:   Move the CQE (Command Queue Entry) to the empty queue
;
;************************************************************
; THEORY:
;            Y points to the CQE to be moved.
;
;************************************************************
; EXIT:
;            NONE
;
;************************************************************
; AUTHOR:    Steve Cornaby
; DATE: 8 Aug 1990
; HISTORY:
;************************************************************

AA9A                       QTOEMPTY:

AA9A    0F                 SEI                              ;Don't allow interrupts while we
                                                                    ; are adjusting pointers
                                   ;remove this CQE from current queue
        AA9B    CD EE 00           LDX     <S_PRV,Y                 ;point X to previous entry
        AA9E    18 EC 02           LDD     <S_NXT,Y                 ; get next of removed queue
        AAA1    ED 02              STD     <S_NXT,X                 :  store in next of previous entry AAA3    CD EE 02           LDX     <S_NXT,Y                 ; point X to next entry
        AAA6    18 EC 00           LDD     <S_PRV,Y                 ; get previous of removed queue
        AAA9    ED 00              STD     <S_PRV,X                 :  store in previous of next entry ;insert new CQE into empty queue
        AAAB    CE 11 C8           LDX     #Y_EMPTY                 ;Get queue header
        AAAE    EE 00              LDX     <S_PRV,X                 ; point to last CQE in queue
        AAB0    1A EF 02           STY     <S_NXT,X                 ;  point next pointer to new CQE
        AAB3    CD EF 00           STX     <S_PRV,Y                 :   point prev pointer of new CQE to last entry AAB6    CE 11 C8           LDX     #Y_EMPTY                 ;Get queue header
        AAB9    1A EF 00           STY     <S_PRV,X                 ; point previous to new CQE
        AABC    CD EF 02           STX     <S_NXT,Y                 :  point next of new CQE to header AABF    0E                 CLI                              ;Interrupts OKAY now AAC0    39                 RTS                              ;Return to post status and sense
```

```
;**********************************************************
; NAME: QTO2CHAN
;**********************************************************
; PURPOSE:   Move the CQE (Command Queue Entry) to the 2channel queue
;
;**********************************************************
; THEORY:
;           Y points to the CQE to be moved.
;
;**********************************************************
; EXIT:
;           NONE
;
;**********************************************************
; AUTHOR:   Steve Cornaby
; DATE: 8 Aug 1990
; HISTORY:
;**********************************************************

QTO2CHAN:
AAC1
AAC1   0F              SEI                         ;Don't allow interrupts while we
                                                   ; are adjusting pointers
                       ;remove this CQE from current queue
AAC2   CD EE 00        LDX    <S_PRV,Y             ;point X to previous entry
AAC5   18 EC 02        LDD    <S_NXT,Y             ; get next of removed queue
AAC8   ED 02           STD    <S_NXT,X             ;  store in next of previous entry AACA   CD EE 02        LDX    <S_NXT,Y             ; point X to next entry
AACD   18 EC 00        LDD    <S_PRV,Y             ;  get previous of removed queue
AAD0   ED 00           STD    <S_PRV,X             ;   store in previous of next entry ;insert new CQE into 1 channel queue
AAD2   CE 11 D4        LDX    #V_2CHAN             ;Get queue header
AAD5   EE 00           LDX    <S_PRV,X             ; point to last CQE in queue
AAD7   1A EF 02        STY    <S_NXT,X             ; point next pointer to new CQE
AADA   CD EF 00        STX    <S_PRV,Y             ;  point prev pointer of new CQE to last entry AADD   CE 11 D4        LDX    #V_2CHAN             ;Get queue header
AAE0   1A EF 00        STY    <S_PRV,X             ; point previous to new CQE
AAE3   CD EF 02        STX    <S_NXT,Y             ;  point next of new CQE to header AAE6   0E              CLI                         ;Interrupts OKAY now AAE7   39              RTS                         ;Return to post status and sense ;**********************************************************
; NAME: QTOSTAT
;**********************************************************
; PURPOSE:   Move the CQE (Command Queue Entry) to the status queue
;
;**********************************************************
; THEORY:
;           Y points to the CQE to be moved.
;           Since it is possible for the host to be connected to the
;           process to give status, QTOSTAT checks for this condition
;           and places the queue at the head if the host is already
;           connected.
;
;**********************************************************
; EXIT:
;           NONE
;
;**********************************************************
; AUTHOR:   Steve Cornaby
; DATE: 8 Aug 1990
; HISTORY:
;**********************************************************

AAE8                   QTOSTAT:
AAE8   0F              SEI                         ;Don't allow interrupts while we
AAE9   14 08 20        BSET   H_PORTD,20h          ;*****TEST*****
                                                   ; are adjusting pointers
                       ;remove this CQE from current queue
AAEC   CD EE 00        LDX    <S_PRV,Y             ;point X to previous entry
AAEF   18 EC 02        LDD    <S_NXT,Y             ; get next of removed queue
AAF2   ED 02           STD    <S_NXT,X             ;  store in next of previous entry AAF4   CD EE 02        LDX    <S_NXT,Y             ; point X to next entry
AAF7   18 EC 00        LDD    <S_PRV,Y             ;  get previous of removed queue
AAFA   ED 00           STD    <S_PRV,X             ;   store in previous of next entry AAFC   CE 11 D8        LDX    #V_STAT              ;Get queue header AAFF   18 A6 23        LDAA   <S_CINITBIN,Y        ;See if we are currently connected
AB02   26 02           BNE    QTOS05               ; request at head, if not, at tail AB04   EE 00           LDX    <S_PRV,X             ; point to last CQE in queue
AB06                   QTOS05:
```

```
13427  AB05  1A EF 02                STY    <S_NXT,X         ; point next pointer to new CQE
13428  AB09  CD EF 00                STX    <S_PRV,Y         ; point prev pointer of new CQE to last entry
13429
13430  AB0C  CE 11 D8                LDX    #V_STAT          ; Get queue header
13431  AB0F  1A EF 00                STY    <S_PRV,X         ; point previous to new CQE
13432  AB12  CD EF 02                STX    <S_NXT,Y         ; point next of new CQE to header
13433
13434
13435  AB15  15 08 20                BCLR   H_PORTD,20h      ;*****TEST*****
13436
13437  AB18  0E                      CLI                     ; Interrupts OKAY now
13438
13439  AB19  39                      RTS                     ; Return to post status and sense
13440
13441              ;**********************************************************************
13442              ; NAME: QTOCNTH
13443              ;**********************************************************************
13444              ; PURPOSE:   Point to the CQE with a the continue queue entry at head.
13445
13446              ;**********************************************************************
13447              ; THEORY:
13448              ;            Y points to the CQE to be pointed to by the continue queue.
13449              ;            AccD points on entry to the continue address
13450
13451              ;**********************************************************************
13452              ; EXIT:
13453              ;            NONE
13454
13455              ;**********************************************************************
13456              ; AUTHOR:    Steve Cornaby
13457              ; DATE: 16 Aug 1990
13458              ; HISTORY:
13459              ;**********************************************************************
13460
13461  AB1A
13462  AB1A                          QTOCNTH:
13463  AB1A                          QTOCNTT:
13464
13465  AB1A  0F                      SEI                      ;Make sure no interrupts occur
13466                                                         ; while CNTH or CNTT is being updated
13467  AB1B  18 ED 09                STD    <S_EXCTADD,Y     ;Store off continue address
13468  AB1E  18 A6 23                LDAA   <S_CINITBIN,Y    ;See if we are currently connected
13469  AB21  27 00                   BEQ    QTOC15           ; request at head, if not, at tail
13470  AB23
13471                          ;place CQE pointer into continue queue at queue head
13472
13473  AB23  FE 11 DC                LDX    V_CNTH           ;Get queue pointed to by queue head
13474  AB26  EE 00                   LDX    <S_PRV,X         ; point to last CQE in queue
13475  AB28  FF 11 DC                STX    V_CNTH           ;Adjust head to point to new entry
13476
13477  AB2B  1A EF 04                STY    <S_CHTQPT,X      ; point to CQE that needs to continue
13478
13479  AB2E  0E                      CLI                     ;Interrupts are OKay now
13480
13481  AB2F  39                      RTS                     ;
13482  AB30                          QTOC15:
13483                          ;place CQE pointer into continue queue at queue tail
13484
13485  AB30  FE 11 DE                LDX    V_CNTT           ;Get queue pointed to by queue tail
13486  AB33  1A EF 04                STY    <S_CHTQPT,X      ; point to CQE that needs to continue
13487
13488  AB36  EE 02                   LDX    <S_NXT,X         ; point to next CQE in queue
13489  AB38  FF 11 DE                STX    V_CNTT           ;Adjust tail to point to next unused
13490                                                         ; entry
13491
13492  AB3B  0E                      CLI                     ;Interrupts are OKay now
13493
13494  AB3C  39                      RTS                     ;
13495
13496              ;**********************************************************************
13497              ; NAME: QTOICHAN
13498              ;**********************************************************************
13499              ; PURPOSE:   Move the CQE (Command Queue Entry) to the Ichannel queue
13500              ;            If the command is directed, check if the chann
13501
13502              ;**********************************************************************
13503              ; THEORY:
13504              ;            Y points to the CQE to be moved.
13505              ;            D contains execution address when execution continues.
13506
13507              ;**********************************************************************
13508              ; EXIT:
13509              ;            NONE
13510
13511              ;**********************************************************************
13512              ; AUTHOR:    Steve Cornaby
13513              ; DATE: 8 Aug 1990
13514              ; HISTORY:
13515              ;**********************************************************************
13516
13517
13518  AB3D                          QTOICHAN:
13519
13520  AB3D  0F                      SEI                      ;Don't allow interrupts while we
```

```
13521                                                         ; are adjusting pointers
13522   A83E  18 ED 09            STD    <S_EXCTADD,Y         ;Store continuing execution address
13523
13524                             ;remove this CQE from current queue
13525   A841  CD EE 00            LDX    <S_PRV,Y             ;point X to previous entry
13526   A844  18 EC 02            LDD    <S_NXT,Y             ; get next of removed queue
13527   A847  ED 02               STD    <S_NXT,X             ;  store in next of previous entry
13528
13529   A849  CD EE 02            LDX    <S_NXT,Y             ; point X to next entry
13530   A84C  18 EC 00            LDD    <S_PRV,Y             ;  get previous of removed queue
13531   A84F  ED 00               STD    <S_PRV,X             ;   store in previous of next entry
13532
13533                             ;insert new CQE into 1 channel queue
13534   A851  CE 11 D0            LDX    #V_1CHAN             ;Get queue header
13535   A854  EE 00               LDX    <S_PRV,X             ; point to last CQE in queue
13536   A856  1A EF 02            STY    <S_NXT,Y             ; point next pointer to new CQE
13537   A859  CD EF 00            STX    <S_PRV,Y             ;  point prev pointer of new CQE to last entry
13538
13539   A85C  CE 11 D0            LDX    #V_1CHAN             ;Get queue header
13540   A85F  1A EF 00            STY    <S_PRV,X             ; point previous to new CQE
13541   A862  CD EF 02            STX    <S_NXT,Y             ;  point next of new CQE to header
13542
13543
13544   A865  0E                  CLI                         ;Interrupts OKAY now
13545
13546   A866  39                  RTS                         ;Return to post status and sense
13547
13548   ;*****************************************************************
13549   ; NAME: QTO1ORD
13550   ;*****************************************************************
13551   ; PURPOSE:    Move the CQE (Command Queue Entry) to the 1channel queue
13552   ;             and order it.
13553
13554   ;*****************************************************************
13555   ; THEORY:
13556   ;             Y points to the CQE to be moved.
13557   ;             D contains execution address when execution continues.
13558   ;             The 1channel queue is traversed and the destination address
13559   ;             compared against that of the new command. When traversal
13560   ;             is complete, X will be pointing to the CQE before which the
13561   ;             current CQE is to be placed.
13562
13563   ;*****************************************************************
13564   ; EXIT:
13565   ;             NONE
13566
13567   ;*****************************************************************
13568   ; AUTHOR:     Steve Cornaby
13569   ; DATE: 8 Aug 1990
13570   ; HISTORY:
13571   ;*****************************************************************
13572
13573
13574   A867                QTO1ORD:
13575
13576   A867  0F                  SEI                          ;Don't allow interrupts while we
13577                                                          ; are adjusting pointers
13578
13579                             ;** Set up continue address
13580
13581   A868  18 ED 09            STD    <S_EXCTADD,Y          ;Store continuing execution address
13582
13583                             ;** Remove this CQE from current queue
13584
13585   A86B  CD EE 00            LDX    <S_PRV,Y             ;point X to previous entry
13586   A86E  18 EC 02            LDD    <S_NXT,Y             ; get next of removed queue
13587   A871  ED 02               STD    <S_NXT,X             ;  store in next of previous entry
13588
13589   A873  CD EE 02            LDX    <S_NXT,Y             ; point X to next entry
13590   A876  18 EC 00            LDD    <S_PRV,Y             ;  get previous of removed queue
13591   A879  ED 00               STD    <S_PRV,X             ;   store in previous of next entry
13592
13593   A87B  0E                  CLI                          ;Allow interrupts now
13594
13595                             ;** Check to see if 1chan queue empty
13596
13597   A87C  CE 11 D0            LDX    #V_1CHAN             ;Get 1channel queue pointer
13598   A87F  EE 02               LDX    <S_NXT,X             ;Point to first entry
13599   A881  8C 11 D0            CPX    #V_1CHAN             ; end if queue empty
13600   A884  26 04               BNE    ORD05                ;Branch if not empty
13601   A886  86 01               LDAA   #01                  ;Set non-sequential flag
13602   A888  20 6A               BRA    ORD100
13603
13604   A88A                ORD05:
13605                             ;** Command with which we are comparing may be directed. If so,
13606                             ;    it doesn't count for the compare. Continue with the next
13607                             ;    CQE.
13608
13609   A88A  1E 08 40 5F         BRSET  <S_QSTAT,X,SB_DRCTD,ORD50 ;Branch if directed command
13610   A88E
13611   A88E                ORD10:
13612                             ;** Command not directed.
13613                             ;** Compare destination cylinder of new CQE against destination
```

```
13614                                              ; cylinder of 1chan CQE. Branch to insert if new less than 1chan.
13615   A88E
13616   A88E    EC 18               LDD     <S_DCYL,X           ;Get destination of 1chan CQE
13617   A890    CD A3 18            CPD     <S_DCYL,Y           ; subtract destination cylinder new CQE
13618   A893    23 04               BLS             ORD15       ; branch if NEW command fits before
13619                                                           ; or is on same cylinder as 1CHAN command
13620   A895    86 01               LDAA    #01                 ;Set non-sequential command
13621   A897    20 59               BRA             ORD100
13622
13623                                       ;** New command is greater than 1chan CQE command. Check to see if
13624                                       ;   it 1channel command is linked to the next command.
13625   A899                ORD15:
13626   A899    1F 0C 01 08         BRCLR   <S_CSTAT,X,SB_CLNKED,ORD20 ;Branch if command not linked
13627   A89D    EE 02               LDX     <S_NXT,X            ;Get next command to check it out
13628   A89F    8C 11 D0            CPX     #V_1CHAN            ;Check if at end
13629   A8A2    26 F5               BNE             ORD15       ; branch if not
13630
13631   A8A4    86 01               LDAA    #01                 ;AccA != 0 means non-sequential
13632   A8A6    20 4C               BRA             ORD100      ; insert at end if we are
13633
13634   A8A8                ORD20:
13635                                       ;** Check if command can be coalesced. First priority is to check
13636                                       ;   if it is the same type of command.
13637
13638   A8A8    A6 10               LDAA    <S_CMD0,X           ;Get op code
13639   A8AA    18 A1 10            CMPA    <S_CMD0,Y           ; check if matches candidate CQE
13640   A8AD    26 3E               BNE             ORD50       ; Different op codes.
13641
13642                                       ;** Command not linked. Check if it is sequential to old command.
13643
13644   A8AF    EC 20               LDD     <S_NXTLBA+1,X       ;Get 1st LBA past old command
13645   A8B1    CD A3 14            CPD     <S_CMD4,Y           ; compare against first LBA of new command
13646   A8B4    26 37               BNE             ORD50       ;Branch if not sequential
13647   A8B6    A6 1F               LDAA    <S_NXTLBA,X         ; High byte
13648   A8B8    18 A1 13            CMPA    <S_CMD3,Y           ;
13649   A8BB    26 30               BNE             ORD50       ;Branch if not sequential
13650
13651                                       ;** Command was sequential. Check if command is still active.
13652                                       ;   If so, link it to the following command.
13653
13654   A8BD    0F                  SEI                         ;Disable interrupts until 1chan
13655                                                           ; queue is updated
13656
13657   A8BE    86 01               LDAA    #01                 ;Use AccA as a flag
13658   A8C0
13659   A8C0    E6 32               LDAB    <S_DSKSTAT,X        ;Get disk status
13660   A8C2    26 25               BNE             ORD35       ; Not executing if status already posted
13661
13662
13663   A8C4    1C 0C 01            BSET    <S_CSTAT,X,SB_CLNKED ;Set linked bit in old CQE
13664   A8C7    18 1C 0C 02         BSET    <S_CSTAT,Y,SB_BLNKED ; and backward linked bit in new CQE
13665
13666                                       ;** Check to see if command we are linking to is currently active
13667   A8CB    1F 0C 04 1A         BRCLR   <S_CSTAT,X,SB_CDATIN,ORD35 ; Not executing if data not in buffer
13668
13669   A8CF    1E 0B 80 0C         BRSET   <S_QSTAT,X,SB_BCHAN,ORD30  ;Branch if executing on channel B
13670
13671                                       ;** Setup linked CQE with same attributes as currently executing CQE
13672
13673                                       ;Set attributes for channel A
13674   A8D3    18 1D 0B 80         BCLR    <S_QSTAT,Y,SB_BCHAN ; Not B channel
13675
13676   A8D7    CC 00 00            LDD     #0                  ;Get channel A offset
13677   A8DA    18 ED 2E            STD     <S_CHANOFF,Y        ; store in CQE channel offset
13678
13679   A8DD    20 0A               BRA             ORD35       ; continue
13680   A8DF                ORD30:
13681                                       ;Set attributes for channel B
13682   A8DF    18 1C 0B 80         BSET    <S_QSTAT,Y,SB_BCHAN ; Not B channel
13683
13684   A8E3    CC 00 20            LDD     #0020h              ;Get channel B offset
13685   A8E6    18 ED 2E            STD     <S_CHANOFF,Y        ; store in CQE channel offset
13686   A8E9                ORD35:
13687   A8E9    EE 02               LDX     <S_NXT,X            ;Point to following CQE so new CQE
13688                                                           ; will be inserted after old CQE
13689   A8EB    20 07               BRA             ORD100      ; Branch to insert CQE
13690
13691                                       ;** new CQE is greater than or equal to 1chan CQE. Move to the next
13692                                       ;   1chan CQE and try again.
13693   A8ED                ORD50:
13694   A8ED    EE 02               LDX     <S_NXT,X            ;Point to next entry
13695   A8EF    8C 11 D0            CPX     #V_1CHAN            ; insert before end of 1chan queue
13696   A8F2    26 9A               BNE             ORD10       ; if pointing to last entry
13697                                                           ; else branch for another compare
13698   A8F4                ORD100:
13699                                       ;** Insert new CQE before 1channel CQE destination.
13700
13701
13702                                       ;insert new CQE into 1 channel queue
13703   A8F4    3C                  PSHX                        ;Preserve CQE before which we will
13704                                                           ; insert new CQE
13705
13706   A8F5    EE 00               LDX     <S_PRV,X            ; point to last CQE in queue
13707   A8F7    1A EF 02            STY     <S_NXT,X            ; point next pointer to new CQE
```

```
13708  A8FA  CD EF 00              STX    <S_PRV.Y       ; point prev pointer of new CQE to last entry
13709
13710  A8FD  38                    PULX                  ;Point at CQE
13711  A8FE  1A EF 00              STY    <S_PRV.X       ; point previous to new CQE
13712  AC01  CD EF 02              STX    <S_NXT.Y       ; point next of new CQE to header
13713
13714  AC04  0E                    CLI                   ;Allow interrupts
13715
13716  AC05  4D                    TSTA                  ;Set zero flag
13717  AC06  39                    RTS                   ;Return to post status and sense
13718
13719
13720                    ;**************************************************************
13721                    ; NAME: CCHAN
13722                    ;**************************************************************
13723                    ; PURPOSE:   Check if there are more entries in the lchannel queue.
13724                    ;            Since channel commands can be directed, check the status
13725                    ;            byte to see which channel we are currently servicing, and
13726                    ;            check for other directed commands to that channel. If
13727                    ;            there are no directed commands for the channel, select
13728                    ;            the first CQE in the lchannel queue and place it in the
13729                    ;            appropriate channel header. Then, clear the executing
13730                    ;            bit such that the kernal will start the new process.
13731
13732                    ;..............................................................
13733                    ; THEORY:
13734                    ;            Y points to the currently executing CQE.
13735
13736                    ;            The lchannel queue is checked to see if it is empty. If
13737                    ;            it is empty, then the address field of the currently
13738                    ;            executing channel is set to zero. If the lchannel queue
13739                    ;            is not empty, but there are no CQEs directed to the
13740                    ;            currently executing CQE, and no non-directed CQEs, the
13741                    ;            address field of the currently executing channel is again
13742                    ;            set to zero.
13743
13744                    ;            The routine will search all lchannel entries for directed
13745                    ;            commands, which are executed first. This occurs because
13746                    ;            directed commands can be steps in the error recovery
13747                    ;            sequence, and the command may be partially complete. In
13748                    ;            addition, read and write buffer commands are directed
13749                    ;            commands.
13750
13751                    ;            This routine is also the location of more complex algorithims
13752                    ;            for CQE selection. Since they are as yet undefined, the
13753                    ;            routine simply selects the first entry.
13754
13755                    ;     *****NOTE!*****
13756                    ;            This routine can be called only after the current operation
13757                    ;            has been removed from the lchannel queue by calling QTOSTAT,
13758                    ;            etc.
13759
13760                    ;..............................................................
13761                    ; EXIT:
13762                    ;            NONE
13763
13764                    ;..............................................................
13765                    ; AUTHOR:    Steve Cornaby
13766                    ; DATE: 8 Sep 1990
13767                    ; HISTORY:
13768                    ;**************************************************************
13769
13770  AC07                  CCHAN:
13771                              ;** Since we will be looking for directed commands, the
13772                              ;   routine splits to a checker for chanA and chanB.
13773        [01]          .if TWOACT
13774  AC07  18 1E 08 80 33        BRSET  <S_QSTAT.Y,SB_BCHAN,CCH19 ;Branch if channel B is ending
13775        [00]          .endif
13776  AC0C  CD EE 02              LDX    <S_NXT.Y       ;Point to CQE after current CQE
13777  AC0F  20 02                 BRA    CCH02
13778  AC11                  CCH00:
13779                              ;** ChanA is ending. Get next CQE, (if any)
13780
13781  AC11  EE 02                 LDX    <S_NXT.X       ;Point to next CQE
13782  AC13                  CCH02:
13783  AC13  8C 11 D0              CPX    #V_lCHAN       ; make sure it isn't header
13784  AC16  26 02                 BNE    CCH05          ;   branch to end if it isn't
13785
13786                              ;** We are pointing to header. We must skip the header and
13787                              ;   point to the next CQE. We are done when we are pointing
13788                              ;   to the CQE currently pointed to by ACHAN.
13789
13790  AC18  EE 02                 LDX    <S_NXT.X       ;Skip header and point to next CQE
13791  AC1A                  CCH05:
13792                              BSET   H_PORT0,10h    ;*****TEST*****
13793
13794  AC1A  BC 11 61              CPX    V_ACHAN        ; check if we are done
13795  AC1D  26 05                 BNE    CCH10          ; Branch if we are not
13796  AC1F  CE 00 00              LDX    #0000h         ;  There are no other commands pending
13797  AC22  20 16                 BRA    CCH18          ;   so clear channel and end
13798  AC24                  CCH10:
13799                              ;** We are pointing to next valid CQE.
13800                              ;** Make sure it is not already being executed on a channel
```

```
13901   AC24   1E 08 02 E9              BRSET   <S_QSTAT,X,SB_CHANLNK,CCH00  ; branch if already linked
13902   AC28   1E 0C 02 E5              BRSET   <S_CSTAT,X,SB_BLNKED,CCH00   ; or if backward coalesced
13903
13904   AC2C   1F 08 40 04              BRCLR   <S_QSTAT,X,SB_DRCTD,CCH15    ;Branch if not a directed command
13905   AC30   1E 08 20 00              BRSET   <S_QSTAT,X,SB_DIRB,CCH00     ;Branch if directed to other channel
13806                                   ;** Command directed to this channel. Point to it and end.
13807   AC34                   CCH15:
13808   AC34   1D 08 30                 BCLR    <S_QSTAT,X,SB_BCHAN          ;Clear channel b bit
13809   AC37   1C 08 02                 BSET    <S_QSTAT,X,SB_CHANLNK        ; and set channel linked bit
13810   AC3A                   CCH18:
13811   AC3A   FF 11 61                 STX     V_ACHAN                      ;Update ACHAN
13812
13813                                   ;       BCLR    H_PORTD,10h          ;*****TEST*****
13814
13815   AC30   20 2E                    BRA     CCH100
13816
13817
13818
13819                                   ;** We are finishing an operation on B channel. Point to CQE
13820                                   ;   immediately after current CQE.
13821
13822          [01]             .if TWOACT
13823   AC3F                   CCH19:
13824
13825   AC3F   CD EE 02                 LDX     <S_NXT,Y            ;Point to next CQE
13826   AC42   20 02                    BRA     CCH22               ;
13827   AC44                   CCH20:
13828
13829                                   ;** ChanA is ending. Get next CQE. (if any)
13830   AC44   EE 02                    LDX     <S_NXT,X            ;Point to next CQE
13831   AC46                   CCH22:
13832   AC46   8C 11 D0                 CPX     #V_1CHAN            ; make sure it isn't header
13833   AC49   26 02                    BNE     CCH25               ; branch to end if it isn't
13834
13835                                   ;** We are pointing to header. We must skip the header and
13836                                   ;   point to the next CQE. We are done when we are pointing
13837                                   ;   to the CQE currently pointed to by BCHAN.
13838
13839   AC4B   EE 02                    LDX     <S_NXT,X            ;Skip header and point to next CQE
13840   AC4D                   CCH25:
13841   AC4D   BC 11 63                 CPX     V_BCHAN             ; check if we are done
13842   AC50   26 05                    BNE     CCH30               ; Branch if we are not
13843   AC52   CE 00 00                 LDX     #0000h              ; There are no other commands pending
13844   AC55   20 13                    BRA     CCH38               ; so clear channel and end
13845   AC57                   CCH30:
13846                                   ;** We are pointing to next valid CQE.
13847                                   ;** Make sure it is not already being executed on a channel
13848   AC57   1E 08 02 E9              BRSET   <S_QSTAT,X,SB_CHANLNK,CCH20  ; branch if already linked
13849   AC5B   1E 0C 02 E5              BRSET   <S_CSTAT,X,SB_BLNKED,CCH20   ; or if backward coalesced
13850
13851   AC5F   1F 08 40 04              BRCLR   <S_QSTAT,X,SB_DRCTD,CCH35    ;Branch if not a directed command
13852   AC63   1F 08 20 00              BRCLR   <S_QSTAT,X,SB_DIRB,CCH20     ;Branch if directed to other channel
13853                                   ;** Command directed to this channel. Point to it and end.
13854   AC67                   CCH35:
13855   AC67   1C 08 82                 BSET    <S_QSTAT,X,SB_BCHAN+SB_CHANLNK  ;Set channel and channel linked bits
13856   AC6A                   CCH38:
13857   AC6A   FF 11 63                 STX     V_BCHAN                      ;Update BCHAN
13858          [00]             .endif
13859
13860
13861   AC6D                   CCH100:
13862   AC6D   0F                       SEI                                  ;Turn off interrupts until done
13863
13864                                   ;** Clear out all entries from CNT queue that match the CQE just
13865                                   ;   completed.
13866                                   ;   AccY points to CQE we are just finishing
13867   AC6E
13868   AC6E   FE 11 DC                 LDX     V_CNTH                       ;See what head is pointing at
13869   AC71   CC 00 00                 LDD     #0h                          ;Initialize AccD to zero
13870   AC74   EE 00                    LDX     <S_PRV,X                     ;Point back one entry on initialization
13871   AC76                   CCH115:
13872   AC76   EE 02                    LDX     <S_NXT,X            ;Look at valid entry
13873
13874   AC78   BC 11 DE                 CPX     V_CNTT              ; check if at tail
13875   AC78   27 09                    BEQ     CCH120              ; branch to end if checked all entries
13876
13877   AC7D   1A AC 04                 CPY     <S_CNTQPT,X         ; Check if CQE matches that just written
13878   AC80   26 F4                    BNE     CCH115              ; branch if no match
13879   AC32   ED 04                    STD     <S_CNTQPT,X         ; Load with zeroes if matches to invalidate
13880   AC84   20 F0                    BRA     CCH115              ; Loop to look again
13881   AC36                   CCH120:
13882   AC86   0E                       CLI                         ;Allow interrupts again
13883
13884   AC87   39                       RTS                         ; and return
13885
13886   ;***********************************************************************
13887   ;   NAME: SCHAN
13888   ;***********************************************************************
13889   ;   PURPOSE:    A non-directed command has just been placed in the 1channel
13890   ;               queue. The current status of the channels is unknown. Scan
13891   ;               the channels to see if they are currently busy. If either is
13892   ;               not busy, copy the CQE pointer into the channel command
13893   ;               register. The kernal will detect an un-started command
13894   ;               and start the channel command
```

```
                   ;**********************************************************
                   ; THEORY:
                   ;        Y points to the CQE just moved to the lchannel queue.
                   ;
                   ;        Channel A is checked to see if it is empty. The channel
                   ;        pointer will be zero if it is empty. If it is not empty,
                   ;        Channel B is checked. If either channel is empty, the
                   ;        contents of Y will be written to it. The channel in
                   ;        process is 0 as it is a new command. The kernal samples
                   ;        for a channel pointer != 0 and a Channel in process = 0
                   ;        to know if it should begin a new command.
                   ;
                   ;**********************************************************
                   ; EXIT:
                   ;        NONE
                   ;
                   ;**********************************************************
                   ; AUTHOR:   Steve Cornaby
                   ; DATE: 11 Sep 1990
                   ; HISTORY:
                   ;**********************************************************

AC38               SCHAN:
AC38   OF                   SEI                              ;No interrupts while we mess with queue

[01]       .if TWOACT

AC39   FE 11 61             LDX    V_ACHAN                   ;Check if channel A free
AC3C   26 OA                BNE            SCOS              ; branch if not
AC3E   18 FF 11 61          STY    V_ACHAN                   ;Channel is free, tell kernal to start
AC92   18 1C 08 02          BSET   <S_QSTAT,Y,SB_CHANLNK     ; CQE is now linked to a Channel
AC96   20 OD                BRA            SCEND             ; branch to continue
AC98               SCOS:
AC98   FE 11 63             LDX    V_BCHAN                   ;Check if channel A free
AC9B   26 03                BNE            SCEND             ; branch if not
AC9D   18 FF 11 63          STY    V_BCHAN                   ;Channel is free, tell kernal to start
ACA1   18 1C 08 02          BSET   <S_QSTAT,Y,SB_CHANLNK     ; CQE is now linked to a Channel
        [01]       .else
                            LDX    V_ACHAN                   ;Check if channel A free
                            BNE            SCEND             ; branch if not
                            STY    V_ACHAN                   ;Channel is free, tell kernal to start
                            BSET   <S_QSTAT,Y,SB_CHANLNK     ; CQE is now linked to a Channel

[00]       .endif
ACA5               SCEND:

ACA5   OE                   CLI                              ;Interrupts are okay now

ACA6   39                   RTS

;**********************************************************
                   ; NAME: FREEZQ
                   ;**********************************************************
                   ; PURPOSE:
                   ;        An error condition occurred on the process. Freeze the Q
                   ;        so that no further operations will occur on the channel
                   ;        until the host has a chance to do a command. Normally, the
                   ;        command would be a request sense command, but if the host
                   ;        instead chooses to do another command, Queue processing will
                   ;        proceed normally.
                   ;
                   ;**********************************************************
                   ; THEORY:
                   ;        Y points to the currently executing CQE.
                   ;
                   ;        The routine will place the Queue in the state that it would
                   ;        normally be if the queue were waiting for a command. It
                   ;        requires a call to SCHAN to re-activate the channel. Such
                   ;        a call occurs on any command, including request sense.
                   ;        Thus, the channel is reactivated at the conclusion of the
                   ;        following command.
                   ;
                   ;**********************************************************
                   ; EXIT:
                   ;        NONE
                   ;
                   ;**********************************************************
                   ; AUTHOR:   Steve Cornaby
                   ; DATE: 28 Dec 1990
                   ; HISTORY:
                   ;**********************************************************

ACA7               FREEZQ:
ACA7   OF                   SEI                              ;Turn off interrupts until done ACA8   CC 00 00             LDD    #0                        ;Initialize AccD with zeros ACAB   18 1D 08 10          BCLR   <S_QSTAT,Y,SB_CHANIP      ;No longer executing on this channel ACAF   18 1E 08 80 05       BRSET  <S_QSTAT,Y,SB_BCHAN,FRZ10 ;Branch if channel B is ending
```

```
13988   AC84   FD 11 61              STJ      V_ACHAN              ;Put A channel to sleep
13989   AC87   20 03                 BRA              FRZ20        ; and end
13990   AC89                 FRZ10:
13991   AC89   FD 11 63              STO      V_BCHAN              ;Put B channel to sleep
13992                                                              ; and end
13993
13994   AC8C                 FRZ20:
13995   AC8C   0E                    CLI                           ;Allow interrupts again
13996
13997
13998   AC8D   39                    RTS                           ; and return
13999
14000   AC8E                         END
14001
14002   AC8E                         INCLUDE  SSDEFECT.ASM         ;Rd defect list / reassign / format
14003                                STTL     SSDEFECT.ASM - Defect handling/reassign/format unit
14004                                PAGE
```

What is claimed is:

1. A task assigning system within a dual actuator disk drive system wherein each task has a cylinder address comprising:

storage means for storing a plurality of tasks;

a first means for assigning tasks stored in said storage means to a first actuator of said dual actuators in the sequence of increasing value of said cylinder addresses of said stored tasks; and a second means for assigning tasks stored in said storage means to a second actuator of said dual actuators in the sequence of decreasing value of said cylinder addresses of said stored tasks.

2. A task assigning system within a dual actuator disk drive system wherein each task has a cylinder address comprising:

a plurality of registers, each said register having a unique address and a plurality of fields for storing a task including said cylinder address associated with said tasks;

a queue comprising a header register, said header register having a plurality of fields;

an insertion means for inserting and ordering said registers into said queue when a task is first stored into said register;

a first means for assigning tasks stored in said queue to a first actuator of said dual actuators in the sequence of increasing value of said cylinder addresses of tasks stored in said registers in said queue; and a second means for assigning tasks stored in said queue to a second actuator of said dual actuators in the sequence of decreasing value of said cylinder addresses of said tasks stored in said registers in said queue.

3. The task assigning system of claim 2 further comprising:

a third means for storing a task in said register that is not inserted in said queue and has the lowest said register address.

4. The task assigning system of claim 2 further comprising:

a fourth means for identifying said addresses for said registers that are not inserted in said queue.

5. The task assigning system of claim 4 further comprising:

a third means for storing a task in said register that has the lowest address identified by said fourth means.

6. The task assigning system of claim 2 wherein each of said registers includes a "next" field and a "previous" field where said "next" field is the address for said register in said queue having the next highest value for said cylinder address of a task and said "previous" field is the address for said register in said queue having the next lowest cylinder address of a task.

7. The task assigning system of claim 6 further comprising:

a third means for storing a task in said register that is not inserted in said queue and has the lowest said register address.

8. The task assigning system of claim 6 further comprising:

a fourth means for identifying said addresses for said registers that are not inserted in said queue.

9. The task assigning system of claim 7 further comprising:

a third means for storing a task in said register that has the lowest address identified by said fourth means.

10. The task assigning system of claim 6 wherein said insertion means orders said register addresses stored in said "next" field and said "previous" field in said registers in said queue whenever a said register is inserted or removed from said queue.

11. The task assigning system of claim 10 further comprising:

a third means for storing a task in said register that is not inserted in said queue and has the lowest said register address.

12. The task assigning system of claim 10 further comprising:

a fourth means for identifying said addresses for said registers that are not inserted in said queue.

13. The task assigning system of claim 12 further comprising:

a third means for storing a task in said register that has the lowest address identified by said fourth means.

14. The task assigning system of claim 11 wherein:

said first means assigns to said first actuator, upon completion of a task by said first actuator, said stored task associated with said register address stored in said "next" field of said register storing said task just completed by said first actuator; and said second means assigns to said second actuator, upon completion of a task by said second actuator, said stored task associated with said register address stored in said "previous" field of said register that is associated with said task just completed by said second actuator.

15. The task assignment system of claim 6 wherein each of said registers further includes a "taken" field where said "taken" field indicates whether or not a said stored task associated with a said register is being processed by said dual actuator disk drive system.

16. The task assigning system of claim 6 wherein:

said first means will assign, upon completion of a task by said first actuator, to said first actuator said stored task associated with said queue register whose "taken" field indicates that said stored task is not being processed and which has the next highest said cylinder address above said cylinder address for said queue register associated with said completed task; and said second means will assign, upon completion of a task by said second actuator, to said second actuator said stored task associated with said queue register whose "taken" field indicates that said stored task is not being processed and which has the next lowest said cylinder address below said cylinder address for said queue register associated with said completed task.

17. The task assigning system of claim 16 wherein said insertion means orders said register addresses stored in said "next" field and said "previous" field in said registers in said queue whenever a said register is inserted or removed from said queue.

18. The task assigning system of claim 16 further comprising:
a third means for storing a task in said register that is not inserted in said queue and has the lowest said register address.

19. The task assigning system of claim 16 further comprising:
a fourth means for identifying said addresses for said registers that are not inserted in said queue.

20. The task assigning system of claim 19 further comprising:
a third means for storing a task in said register that has the lowest address identified by said fourth means.

21. The method of assigning tasks in a dual actuator disk drive system wherein each task has a cylinder address, the disk drive system includes a plurality of task registers for storing tasks, a queue comprising a header register, an insertion means for inserting the task registers into the queue when a task is first stored in the task register, where the header register and each task register has a unique address, a "next" field having the address of the task register in the queue having the next highest cylinder address above the cylinder address of the task stored in the register, a "previous" field having the address of the register in the queue having the next lowest the cylinder address below the cylinder address of the task stored within the queue, the task registers also having a "taken" field to indicate whether or not the stored task associated with the register is being processed by the disk drive system and a "cylinder address" field for storing the cylinder address associated with the stored task; and a second means for identifying the address for the task registers that are not inserted in the queue, said method comprising a routine for storing a task into a task register and inserting the task into the queue having the steps of:
a) going to the header register;
b) branching to step d and following the path of option A if the "next" field is equal to the header register address go;
c) going to the present task register whose address is in the "next" field of the register being tested by step b;
d) branching to step b if the cylinder address of the task stored in the present task register is less than the cylinder address of the task to be inserted, otherwise go to step d and follow the path of option B;
e) storing the task into the selected task register having the lowest address identified in the second means;
f) setting the "next" field of the selected task register if option A to the address of the header register or if option B to the address of the present register;
g) setting the "previous" field of the selected task register to the address in the "previous" field if option A of the header register or if option B of the present task register;
h) if option A setting the "next" field of the present task register to the address of the selected task register or if option B setting the "next" field of the task register whose address is in the "previous" field of the present task register to the address of the selected task register; and
i) if option A setting the "previous" field of the header register to the address of the selected task register or if option B setting the "previous" field of the present task register to the address of the selected task register; and
j) end the routine.

22. The method of claim 21 further comprising the routine for removing the task register for a completed task from the queue, said routine having the steps of:
a) setting the "next" field of the task register whose address is in the "previous" field of the completed task register to the address in the "next" field of the completed task register;
b) setting the "previous" field of the task register whose address is in the "next" field of the completed task register to the address of the "previous" field of the completed task register;
c) setting the "taken" field of the completed task register to zero;
d) identifying the address of the completed task register in the second means; and
e) end the routine.

23. The method of claim 21 further comprising the routine for assigning a new task to CHANNEL A for the first actuator of the dual actuators of the disk drive system when the last byte of data has been transferred by the first actuator for the current register storing the task assigned to CHANNEL A, the routine comprising the steps of:
a) going to the current register;
b) going to the present task register whose address is in the "next" field of the task register being tested or to the present task register whose address is in the "next" field of the header register if the "next" field of the register being tested is the address of the header register;
c) branching to step b if the "taken" field of the present register indicates that the present register is taken, otherwise setting the "taken" field of the present register to taken and assigning the task stored in the present task register to CHANNEL A for processing; and
d) end the routine.

24. The method of claim 21 further comprising the routine for assigning a new task to CHANNEL B for the second actuator of the dual actuators of the disk drive system when the last byte of data has been transferred by the second actuator for the current register storing the task assigned to CHANNEL B, the routine comprising the steps of:
  a) going to the current register;
  b) going to the present task register whose address is in the "previous" field of the task register being tested or to the present task register whose address is in the "previous" field of the header register if the "previous" field of the register being tested is the address of the header register;
  c) branching to step b if the "taken" field of the present register indicates that the present register is taken, otherwise setting the "taken" field of the present register to taken and assigning the task stored in the present task register to CHANNEL A for processing; and
  d) end the routine.

* * * * *

UNITED STATES PATENT AND TRADEMARK OFFICE
CERTIFICATE OF CORRECTION

PATENT NO. : 5,355,486
DATED : October 11, 1994
INVENTOR(S) : Stephen R. Cornaby It is certified that error appears in the above-indentified patent and that said Letters Patent is hereby corrected as shown below:

Column 3, line 15, "transversa" should be --transverse--.

Column 3, line 41, "show" should be --shown--.

Column 5, line 40, "are" should be --is--.

Column 6, line 28, "contain" should be --contains--.

Column 8, line 27, "the" should be --The--.

Column 9, line 43, "show" should be --shows--.

Column 10, line 8, "show" should be --shows--.

Column 12, line 11, "store" should be --stored--.

Column 29, line 48, after "lowest" delete "the".

Column 30, line 4, "d" should be --e--.

Signed and Sealed this

Twenty-third Day of July, 1996

Attest:

BRUCE LEHMAN

Attesting Officer

Commissioner of Patents and Trademarks